United States Patent [19]

Fukuma et al.

[11] 4,151,450
[45] Apr. 24, 1979

[54] PROTECTIVE MEANS FOR FEEDER OF MACHINERY WITH DC-MOTOR

[75] Inventors: Nobuo Fukuma, Toyota; Yoshito Kato, Aichi; Kouji Nogami, Toyota, all of Japan

[73] Assignee: Toyota Jidosha Kogyo Kabushiki Kaisha, Toyota, Japan

[21] Appl. No.: 819,814

[22] Filed: Jul. 28, 1977

[30] Foreign Application Priority Data

Sep. 22, 1976 [JP] Japan .................. 51-127719[U]

[51] Int. Cl.² .......................................... H02K 17/32
[52] U.S. Cl. ................................ 318/317; 318/332; 318/341; 318/342; 318/434
[58] Field of Search ............... 318/310, 311, 312, 317, 318/313, 326, 341, 327, 332, 434, 461, 465, 345 B, 342; 361/51, 239, 242

[56] References Cited

U.S. PATENT DOCUMENTS

| | | | |
|---|---|---|---|
| 3,617,844 | 11/1971 | Grygera | 318/327 |
| 3,691,440 | 9/1972 | Haddock | 318/313 |
| 3,952,236 | 4/1976 | Hoover | 318/326 |

*Primary Examiner*—Robert K. Schaefer
*Assistant Examiner*—M. K. Mutter
*Attorney, Agent, or Firm*—Koda and Androlia

[57] ABSTRACT

A protective means for a feeder of machinery having means for transmitting control signal formed from the differential between a predetermined revolution speed and an actual revolution speed of a DC-motor for driving the feeder, and a means to control current in the DC-motor according to said control signal, thereby protecting the motor against excessive current.

4 Claims, 2 Drawing Figures

PROTECTIVE MEANS FOR FEEDER OF MACHINERY WITH DC-MOTOR

BACKGROUND OF THE INVENTION

1. Field of the Invention

This invention relates to a protective means for a feeder of machinery with a DC-motor, and more particularly to an improvement of a means for protecting the armature of the DC-motor against excessive current.

2. Prior Art

Feeders for shifting a work-table of machinery are generally driven by a hydraulic cylinder mechanism. A hydraulic cylinder mechanism is advantageous in being readily controllable and able to exercise greater driving power; therefore, it is suited for a means to create thrust to shift a work-table. However, a hydraulic cylinder mechanism suffers some drawbacks such as inexact positioning of the work-table and a shorter life as well as insufficient productivity due to changes in temperature or quality of liquid to be used. In addition, it will easily cause pollution problems such as oil leakage and noisy operation.

In place of the conventional hydraulic cylinder mechanism mentioned above, it has been proposed to move the work-table by driving a motor. However, this did not enjoy all the advantages provided by the hydraulic cylinder mechanism. Particularly in the case of a AC-motor, it is not easy to change the revolution speed quickly and accurately, whereby it is needed to have a complex gear box and the like which will render the total price very expensive. In addition, because of the gear box, it is difficult to keep up the exact positioning of the work-table; therefore, the work-table must be repeatedly moved back and forth when being positioned, thereby shortening its life because of friction.

In an attempt to resolve those drawbacks mentioned above, DC-motors have been introduced to replace AC-motors, since DC-motors are advantageous in controlling the positioning of the work-table by adjusting the current in the armature, and particularly suited for compact type feeders. However, there exist a serious disadvantage in using a DC-motor for this purpose. Namely, the current tends to change too much in the armature thereby causing damage to the DC-motor due to unavoidable excessive current once in a while.

SUMMARY OF THE INVENTION

This invention has been developed in an attempt to solve the problem discussed above. Accordingly, the primary object of this invention is to provide a protective means for feeders with a DC-motor, whereby the armature of the DC-motor is protected against current which otherwise would damage the armature when being excessive.

To achieve this object, this invention has introduced a novel characteristic that the maximum current in the armature is limited to a certain degree, thereby avoiding any excessive current.

More specifically, a speed detecting means is provided to sense the revolution speed of the rotating shaft of the DC-motor, said revolution speed being to be compared to a predetermined speed, thereby obtaining a signal on the differential therebetween. This signal is to pass to a control means checking if the signal is below a permitted point. Any signal below such point is allowed to pass through and those signals over such point will be so modified by the control means as to be within the permitted point. The signal from the control means will be sent to another control means to adjust current in the armature.

DETAILED DESCRIPTION OF THE INVENTION

Figure 1:
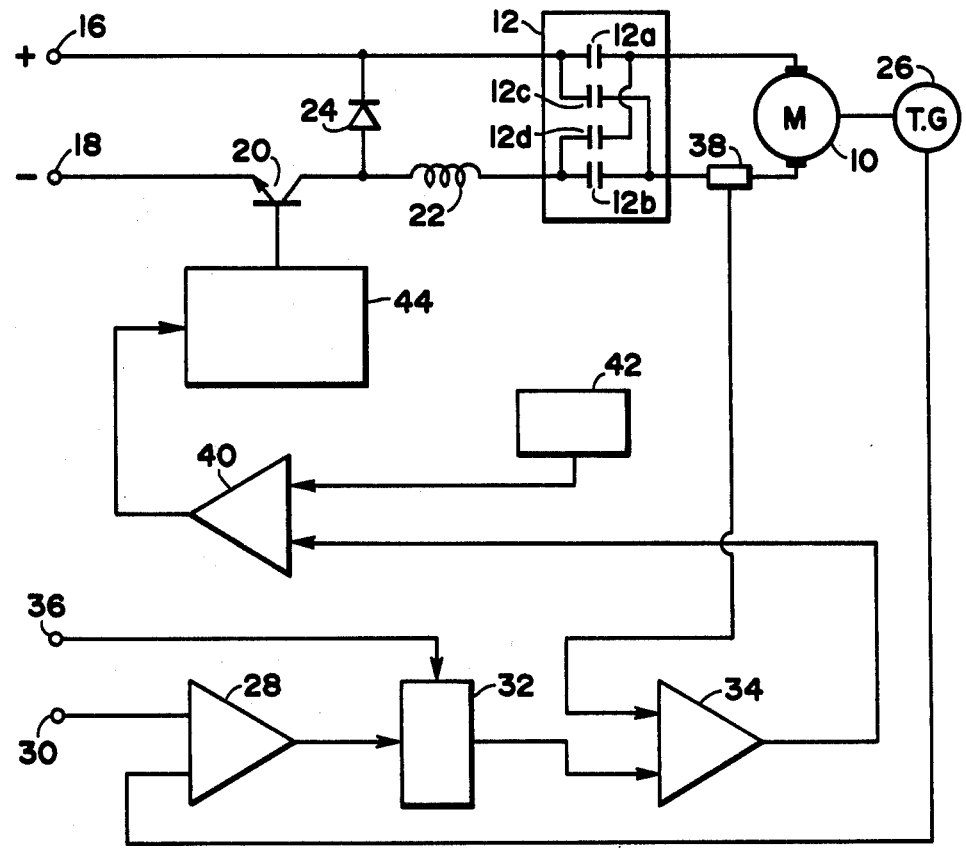
FIG. 1 shows a circuit of a preferable embodiment of the protective means of this invention.

FIG. 1 shows a circuit of the protective means to control a DC-motor which drives a work-table of a machinery. The driving shaft of a DC-motor 10 is coupled to a known work-table (not shown). The armature of the DC-motor 10 is supplied with current through a forward-reverse switching circuit 12. The direct current stored at in-put ends 16 and 18 is supplied to the DC-motor 10 in such a manner that said current is controlled by the ON-OFF action of a control transistor 20, whereby the armature will receive a desired amount of current. The out-put wave shape obtained at the out-put end of the transistor 20 will be a pulse wave shape, whose pulse depends upon the duty-ratio; said pulse wave is to be modified to be flat by an inductance 22. Thus, the armature will receive flat direct current. A zener diode 24 is provided between the end 16 and the collector of the transistor 20 so that excessive voltage can be avoided at the ends of the transistor 20 even at sudden changes of the current in the armature. The forward-reverse switching circuit 12 comprises a relay circuit where the contacts 12a and 12b and the contacts 12c and 12d are alternately switched according to forward-reverse signals.

In this embodiment, the speed control of the feeder of the machinery is performed by adjusting the current supplied to the armature. There is provided a tacho-generator 26 next to the motor 10 so that the revolution speed of the main shaft of the motor 10 is continuously checked by said tacho-generator 26. The out-put voltage from the tacho-generator will be supplied to one of the in-put ends of a comparator 28 comprising a diffrential method amplifier. A predetermined speed signal is sent to the other in-put end from an end 30, whereby the revolution speed of the DC-motor 10 is modified so as to be within the predetermined speed. The predetermined speed is dependent upon the movement of the work-table and the value thus determined is either intermittently or continuously varied.

The out-put of the comparator 28 is supplied to one of the in-put ends of a current comparator 34 comprising a differential method amplifier through a current control circuit 32. The current control circuit 32 comprises a selection circuit including diodes, where one selection branch thereof is coupled to the out-put end of the comparator 28 and the other branch is coupled to the end 36 which receives the predetermined value for current. The end 36 is connected to a voltage divider (not shown); thus, the selection branch receives control signals which transmits the desired current value for the armature. In this embodiment, the out-put control signals from the comparator 28 is so controlled to be within the predetermined value due to the control circuit 32, thereby protecting the armature against excessive current. In other words, if the out-put from the comparator 28 is within the predetermined value from the end 36, such out-put is allowed to get to the comparator 34; on the other hand, if the out-put is over the predetermined value, such out-put is reduced so as to be always within the predetermined value. Therefore, even when the actual speed of the motor is far beyond the predetermined value given at the end 36 and accordingly the comparator 28 would send an out-put to permit excessive current to the armature, the out-put will be checked and limited to the predetermined value by the control circuit 32.

Thus, the control signals are kept within the predetermined value when being lead to the driving transistor 20. In this embodiment, an armature current comparator circuit is provided in an attempt to improve the accuracy of the positioning of the work-table. This comparator circuit includes the comparator 34 where the other in-put end is to receive the armature current signals from a shunt resistor 38 contained in the armature circuit. The comparator 34 will compare the armature current signals to the out-put signals from the current control circuit and then transfer the out-put to one of the in-put ends of a circuit 40. To the other end of the threshold circuit 40, the out-put from a triangular wave generator circuit 42 is supplied and the out-put is transferred to a transistor driving circuit 44.

As discussed above, the speed control signals are supplied to the base of the transistor 20, thereby controlling the revolution speed of the DC-motor 10 within a desired value. In the embodiment a transistor is employed to control the current to the armature; however, a thyristor may also be preferable.

Figure 2:
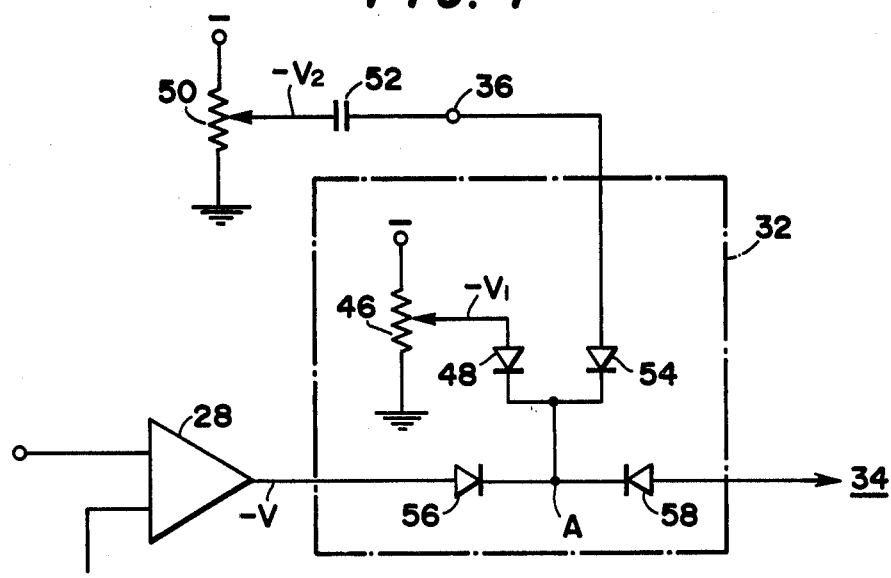
FIG. 2 shows an example of a current control circuit.

FIG. 2 shows one example of the above described current control circuit 32. This control circuit 32 as its predetermined values has a first predetermined voltage $-V_1$ determinable by voltage divider 46 and a second predetermined voltage $-V_2$ also determinable by voltage divider 50, functioning to compare those values with the output $(-V)$ of comparator 28.

The voltage $-V_1$ is connected to point A through a diode 48, while the voltage $-V_2$ is in connection to the point A by way of contact element 52 adapted to be made "on" when machinery is at dwell (upon completion of cutting stroke, the slide rest stops at its extreme forward position) and thence diode 54. The comparator 28 has its output connected to the point A through diode 56. The voltage at the point A is applied to comparator 34 through a reverse diode 58. The voltage $-V_1$ is to determine a value of instantaneous maximum current of the armature while on the other hand the voltage $-V_2$ is to determine that of allowable current at the dwell time; and the relation between the two is $-V_1 < -V_2$. In this control unit 32, the voltage at A assumes the highest one of the outputs from the diode 48, 54 and 56. Accordingly, as in the normal case the contact element 52 is "off", there appears either one of the outputs $-V_1$, $-V$ from diodes 48, 56, whichever higher. For example, when D-C motor starts, $-V$ shows a considerably great negative voltage $(-V < -V_1)$, and on the occasion the output $-V_1$ of the diode 48 becomes the output of the control unit 32. Hence, the occurrence of excessive current at the time of motor start will be prevented. Because of the relation $-V > -V_1$ existent at the time of normal operation of D-C motor, the output $-V$ from the diode 56 becomes an output from the control circuit 32. And, at the dwell the contact 52 is made "on" the output $-V$ from diode 56 is compared with $-V_2$, and $-V_2$ becomes an output from the control circuit 32 $(-V < -V_2)$. No occurrence of excessive current at the dwell time likewise will be avoided.

As seen above, this invention provides advantages over the prior art such as a longer life and greater security.

In other words, the armature is protected against excessive current by controlling the current to be sent to the DC-motor. This invention enjoys those advantages by installing a very simple and compact current control circuit as a protective means for the feeders of the machineries; therefore, this invention is particularly suited for the compact type feeding devices with a DC-motor.

We claim:

1. A protective means for a feeder of machinery with a DC-motor to drive a work-table comprising a detecting means for sensing revolution speed of a main shaft of said DC-motor, a comparator means for transmitting control signals based upon difference measured by comparing the revolution speed thus sensed to a predetermined speed value, a control means for limiting said control signals to a predetermined value in case such control signals are beyond said predetermined value, said control means comprising a means respectively for setting up a first value or a second value as its predetermined value and said first value corresponds to a maximum allowable value of an armature current and said second value corresponds to a value smaller than said maximum allowable armature current, and an armature current control means for adjusting current to an armature of the DC-motor according to said control signals.

2. A protective means according to claim 1, wherein said control means is a current control circuit.

3. A protective means according to claim 1, wherein said armature current control means comprises a triangle wave generator circuit, a threshold circuit to transmit pulse waves by modifying triangular waves from said generator circuit in accordance with control signals from said control means, and ON-OFF switching elements contained in the armature current circuit for switching according to out-put signals from said threshold circuit.

4. A protective means according to claim 2, wherein said armature current control means comprises a triangle wave generator circuit, a threshold circuit to transmit pulse waves by modifying triangular waves from said generator circuit in accordance with control signals from said control means, and ON-OFF switching elements contained in the armature current circuit for switching according to out-put signals from said threshold circuit.

* * * * *